J. E. CODY & F. J. KOORS.
SINK STRAINER.
APPLICATION FILED NOV. 16, 1908.

948,954.

Patented Feb. 8, 1910.

WITNESSES:
D. E. Carlsen.
E. C. Carlsen

INVENTORS:
James E. Cody.
Frank J. Koors.
BY their ATTORNEY:
A. M. Carlsen.

UNITED STATES PATENT OFFICE.

JAMES E. CODY AND FRANK J. KOORS, OF ST. PAUL, MINNESOTA.

SINK-STRAINER.

948,954.                    Specification of Letters Patent.       Patented Feb. 8, 1910.

Application filed November 16, 1908. Serial No. 462,761.

*To all whom it may concern:*

Be it known that we, JAMES E. CODY and FRANK J. KOORS, citizens of the United States, residing at St. Paul, in the county of Ramsey and State of Minnesota, have invented a new and useful Sink-Strainer, of which the following is a specification.

Our invention relates to improvements in sink-strainers of the kind that are periodically removed from the sink for the purpose of emptying out of it the solid matter arrested by it when dishwater and the like is passed through it into the sink. And the main object is to provide a sink strainer which when removed from a sink to be emptied will not permit water to drip on the floor from the more or less watery or wet contents of the strainer. This and other objects we attain by the construction and arrangement of parts illustrated in the accompanying drawing, in which—

Figure 1:
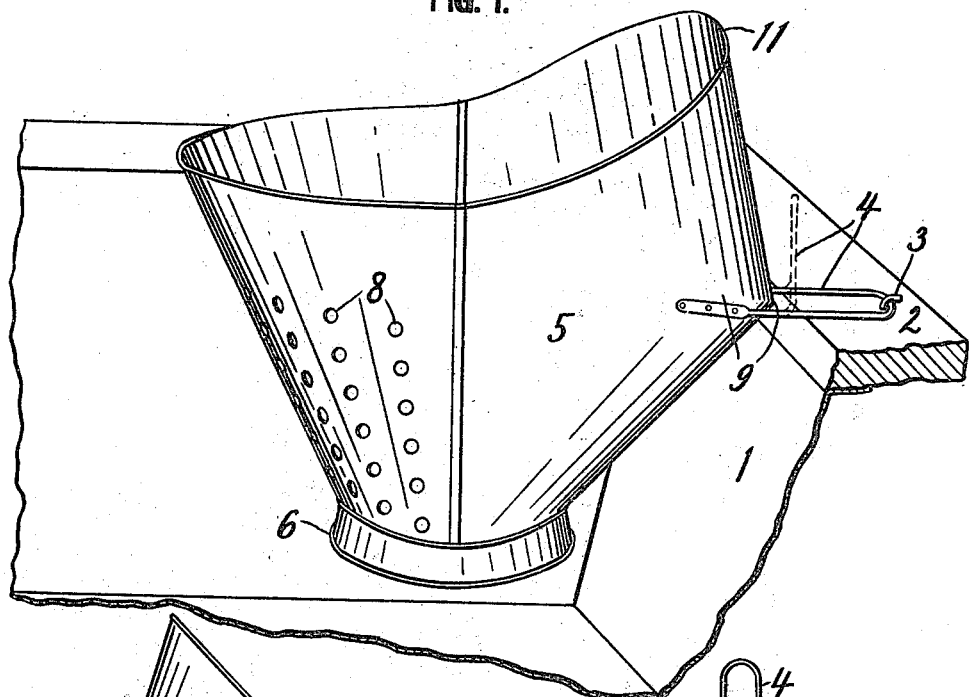
Figure 2:
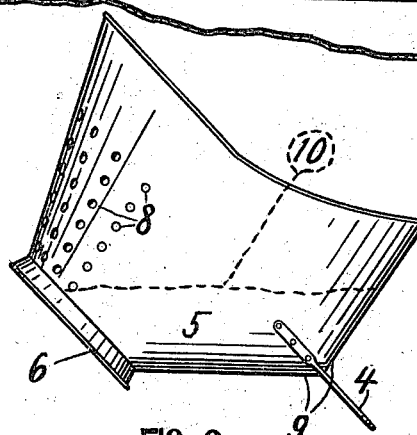
Figure 3:
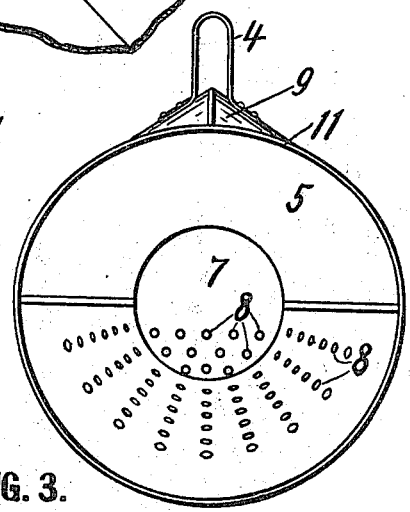

Figure 1 is a perspective view of our improved sink strainer and a portion of a sink on which it is supported. Fig. 2 is a side view of the strainer in the tilted position in which it is held while being carried from the sink. Fig. 3 is a top view of the strainer.

Referring to the drawing by reference numerals, 1 designates a sink upon whose adjacent wood work 2 may be provided a peg or hook 3 on which to suspend or removably support the strainer 5 by placing its metallic loop 4 on the peg. Said loop is fixed to the back side of the strainer and is preferably made of so soft wire that it may be bent upward as shown in dotted lines in Fig. 1 when the supporting peg must be secured in the splash board extending upwardly from the rear side of the sink where the sink has no other wood work upon its edges or where it is more desirable to suspend the strainer from the splash board. The strainer is also provided about its bottom with an external downward rim 6 on which it may stand in the sink where so preferred.

The strainer consists of a downwardly tapering or converging vessel 5 made of tin, galvanized iron or any other suitable sheet metal. The front side of the vessel and the front portion of the bottom 7 are provided with perforations, and the rear or back side of the vessel is formed with an outward bulge or pocket 9 intermediate its upper and lower edges.

In the use of the device, the strainer is placed in or over the sink as described, and as water containing vegetable refuse or the contents of coffee pots, tea pots and dish water &c. are poured into the strainer the most of the water passes through the perforations 8 and thence down into and through the sink, while the coffee grounds, peelings &c. are retained in the strainer together with a small quantity of water which will require long time to separate from the solids and drip down into the sink. When the strainer is more or less filled with such wet, dripping refuse it is picked up, tilted backward to the position shown in Fig. 2, whereby the contents or at least the liquid it still contains occupies the position indicated by the dotted line 10 in Fig. 2 so that no liquid can pass out through the perforations but settles into the rear pocket or enlargement 9, and while held in said position the strainer is carried to the swill barrel or box or temporary swill pail and emptied, whereupon it is brought back into the sink again.

From the above description it will be seen that by means of the rear pocket, bulge or chamber 9 acts as a reservoir for the liquid and prevents it from dripping on floors of kitchens, halls and other places during the transportation of the strainer to the place where it is to be emptied. And to make said rear bulge or reservoir so much more effective it is extended upwardly so that the rear side 11 of the vessel comes higher up than the front side.

What we claim is:

1. A sink-strainer involving a downwardly tapering vessel with perforations in its front side and in its rear side an outward bulge or enlargement for the purpose set forth, said rear side of the vessel being higher than the front side and having its upper edge gradually sloped down to the top of the front side.

2. A sink-strainer involving a downwardly tapering vessel having a fixed bottom and perforations in its front side, and in its rear side an outward bulge or enlargement for the purpose set forth, and means for supporting the strainer in the sink, said means comprising a bendable metallic loop or hanger fixed upon the rear side of the vessel, and a rim about the bottom end of the vessel, for the purposes set forth.

3. A sink-strainer involving a downwardly tapered vessel provided with a flat fixed bottom to stand on in normal position, the adjoining portions of the bottom and of the front wall of the vessel being perforated for straining purposes, the rear side of the vessel being imperforated, higher than the front side and bulged outward intermediate its upper and lower terminals beyond a straight vertically disposed line through said terminals when the vessel is in normal position, substantially as and for the purpose set forth.

In testimony whereof we affix our signatures, in presence of two witnesses.

JAMES E. CODY.
FRANK J. KOORS.

Witnesses:
BERNARD McGRAW,
MARY McGRAW.